No. 808,100. PATENTED DEC. 26, 1905.
F. J. MACHALSKE.
PROCESS OF MAKING CHLORIDS OF CARBON.
APPLICATION FILED JUNE 1, 1905.
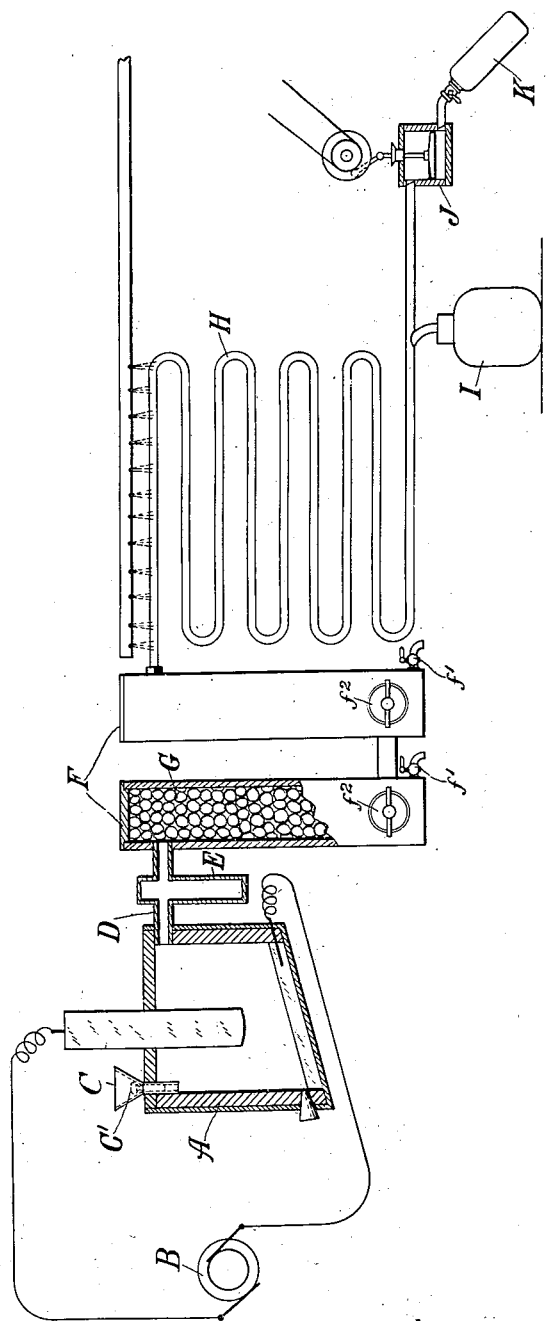

UNITED STATES PATENT OFFICE.

FLORENTINE J. MACHALSKE, OF BROOKLYN, NEW YORK, ASSIGNOR TO FREDERICK DARLINGTON, OF GREAT BARRINGTON, MASSACHUSETTS.

PROCESS OF MAKING CHLORIDS OF CARBON.

No. 808,100.      Specification of Letters Patent.      Patented Dec. 26, 1905.

Application filed June 1, 1905. Serial No. 263,287.

*To all whom it may concern:*

Be it known that I, FLORENTINE J. MACHALSKE, a citizen of the United States, residing at Brooklyn, county of Kings, State of New York, have invented certain new and useful Improvements in Process of Making Chlorids of Carbon, of which the following is a full, clear, and exact description.

My invention relates to a process of making chlorids of carbon, and has for its object to provide a simple and efficient method for accomplishing this result.

According to this process by the application of heat to a suitable mixture oxychlorids of carbon (chloro-carbonic acid) or its corresponding perchloro-methylformate ($CClO_2CCl_3$) are first formed, from which by a subsequent treatment chlorids of carbon and carbonic anhydrid are obtained. The oxychlorids of carbon are obtained by making an admixture of calcium oxid, calcium chlorid, and carbon, there being two parts of calcium oxid, two parts of calcium chlorid, and ten parts of carbon, the carbon being preferably in the form of broken coke. This mixture is heated, the heat being preferably effected in an electric furnace in which a non-oxidizing atmosphere is maintained. The resulting products are four parts of calcium carbid and two parts of oxychlorid of carbon. The charge should be free from water and the products kept from contact with the air or with moisture. The reaction is represented by the following equation:

(1) $2CaO + 2CaCl_2 + 10C = 4CaC_2 + 2COCl_2$.

The heating is preferably effected in an electric furnace of either the arc or resistance type. An alternating current is preferred of from one thousand amperes at fifty volts to sixteen hundred and seventy amperes at thirty volts, either of which is sufficient for a furnace of the usual size. The oxychlorid of carbon, ($COCl_2$,) which is formed by the direct union of carbonic oxid and chlorin set free on heating the mixture, is passed through a mass of bone-black, coke, or pumice, the reaction being an exothermic one, and, further, by the influence of surface contact results in its decomposition into carbon tetrachlorid ($CCl_4$) and carbon dioxid ($CO_2$) in accordance with the following equation:

(2) $2COCl_2 = CCl_4 + CO_2$.

Both these products being in gaseous form are separated by passing the same through a reflux condenser, whereby the carbon tetrachlorid is converted into a liquid form, the remaining gas, carbon dioxid, is withdrawn by a compressor and liquefied thereby, or it may be used in gaseous form in chemical processes, as the case may be.

While it is preferable to use calcium chlorid, the process can be carried out with other chlorids. Thus, for instance, sodium or magnesium chlorid, &c., may be used. In case sodium chlorid is used the reaction may be represented by the following equation:

$2CaO + 4NaCl + 10C = $
$\quad\quad (2CaC_2 + 2Na_2C_2) + 2COCl_2$.

In this case the oxychlorid of carbon ($COCl_2$) passes off as a gas and is treated as above described.

A suitable apparatus for carrying out this process is shown in the annexed diagrammatic drawing. It is obvious, however, that the carrying out of the process is not limited to the use of this particular apparatus, but that the apparatus can be modified in various ways.

Referring more particularly to the drawings, A represents an electric furnace of the ordinary form connected, preferably, with an alternating-current generator B.

C is the hopper for receiving the charge, and D is the exit for gases which result from the operation. The passage leading from the exit is provided with a dust-collector E and opens into a system of towers F of as many units as may be desired, connected alternately, as indicated. The towers are provided with taps $f'$ and hand-holes $f^2$ and are filled with coke, bone-black, or pumice G, through which the oxychlorids of carbon are passed and by which they are decomposed into carbon tetrachlorid and carbon dioxid. The carbon tetrachlorid and carbon dioxid in gaseous form are passed through the worm H of a water-cooled condenser, the result being that the carbon tetrachlorid is converted into liquid form, flowing into the receiver I. The remaining gas, carbon dioxid, is drawn from the worm by the compressor J and, if desired, liquefied thereby, so as to be received by the retort K. The residuum in the furnace is removed in any suitable manner.

The furnace when in operation is sealed, the opening through the hopper being closed by the products of combustion or by a plug C", so as to prevent the entrance of air and to maintain a non-oxidizing atmosphere.

What I claim is—

1. The process of producing a chlorid of carbon, which consists in subjecting a mixture of oxids, chlorids and carbon to heat and thereby forming oxychlorids of carbon, and subsequently decomposing said oxychlorids of carbon so as to obtain a chlorid of carbon, as set forth.

2. The process of producing a chlorid of carbon, which consists in producing a mixture of an oxid of an alkaline earth and a chlorid and carbon and subjecting the same to heat of a high temperature so as to produce oxychlorids of carbon and subsequently decomposing said oxychlorids of carbon into carbon tetrachlorid and carbon dioxid, as set forth.

3. The process of producing a chlorid of carbon, which consists in subjecting a charge of calcium oxid, calcium chlorid and carbon to heat sufficient to produce oxychlorids of carbon, and subsequently decomposing said oxychlorids of carbon into carbon tetrachlorid and carbon dioxid, as set forth.

4. The process of producing carbon tetrachlorid, which consists in forming a mixture of calcium oxid, calcium chlorid and carbon adapted to react and form oxychlorids of carbon and subjecting the admixture to heat of an electric furnace sufficient to effect such reaction and subsequently decomposing the oxychlorids of carbon into carbon tetrachlorid and carbon dioxid, as set forth.

5. The process of producing carbon tetrachlorid, which consists in forming a mixture of calcium oxid, calcium chlorid and carbon adapted to react and form oxychlorids of carbon and subjecting the admixture to heat sufficient to effect such reaction and subsequently decomposing the oxychlorids of carbon into carbon tetrachlorid and carbon dioxid and condensing said carbon tetrachlorid, as set forth.

FLORENTINE J. MACHALSKE.

Witnesses:
H. B. BROWNELL,
L. VREELAND.